(12) United States Patent
Ross et al.

(10) Patent No.: US 9,172,116 B2
(45) Date of Patent: Oct. 27, 2015

(54) SYSTEM AND METHOD FOR REMOTE MANAGEMENT OF ELECTRIC VEHICLE CHARGE PROFILES

(75) Inventors: Steven J. Ross, Livonia, MI (US); Jing Zang, Gross Pointe Park, MI (US); Jeffrey G. Ravas, Oxford, MI (US); Dana B. Fecher, Farmington Hills, MI (US); Paul H. Pebbles, Novi, MI (US)

(73) Assignee: GENERAL MOTORS LLC., Detroit, MI (US)

( * ) Notice: Subject to any disclaimer, the term of this patent is extended or adjusted under 35 U.S.C. 154(b) by 748 days.

(21) Appl. No.: 12/870,353

(22) Filed: Aug. 27, 2010

(65) Prior Publication Data

US 2012/0049793 A1    Mar. 1, 2012

(51) Int. Cl.
*H02J 7/00* (2006.01)
*H01M 10/44* (2006.01)

(52) U.S. Cl.
CPC .............. *H01M 10/44* (2013.01); *Y02T 90/168* (2013.01); *Y04S 30/12* (2013.01)

(58) Field of Classification Search
CPC ...................................................... Y02T 90/14
USPC ......................................... 320/104, 109, 108
See application file for complete search history.

(56) References Cited

U.S. PATENT DOCUMENTS

| | | | |
|---|---|---|---|
| 6,181,991 B1 * | 1/2001 | Kondo et al. | 701/22 |
| 8,188,705 B2 * | 5/2012 | Wakayama | 320/104 |
| 2007/0255612 A1 * | 11/2007 | Baraty | 705/10 |
| 2011/0191220 A1 * | 8/2011 | Kidston et al. | 705/34 |
| 2011/0245987 A1 * | 10/2011 | Pratt et al. | 700/295 |
| 2011/0282527 A1 * | 11/2011 | Inbarajan et al. | 701/22 |
| 2011/0313603 A1 * | 12/2011 | Laberteaux et al. | 701/22 |

FOREIGN PATENT DOCUMENTS

WO    WO 2010/022059 A1    2/2010

* cited by examiner

*Primary Examiner* — Edward Tso
*Assistant Examiner* — Ahmed Omar
(74) *Attorney, Agent, or Firm* — Leydig, Voit & Mayer, Ltd.

(57) ABSTRACT

The described principles provide a method and system for assisting a user of an electric vehicle in maintaining a charge state of the chargeable onboard energy storage system. In an implementation, an intuitive remote interface allows the user to create, modify, save and select profiles. The user may select a profile to apply at a current time as well as optionally at a later time. A profile may have a date limitation or day of week limitation in addition to a time limitation. In an implementation, the user may opt to apply a selected profile to a plurality of vehicles. A linkage with utility data allows for the use of rate-based criteria in an implementation.

14 Claims, 6 Drawing Sheets

SYSTEM AND METHOD FOR REMOTE MANAGEMENT OF ELECTRIC VEHICLE CHARGE PROFILES

BACKGROUND OF THE INVENTION

Electric vehicles are increasingly practical and popular, providing users with a cleaner alternative to internal combustion driven vehicles, while also providing a degree of protection against volatile fuel costs. As used herein, the term "electric vehicle" refers to a vehicle that is propelled by one or more electric motors linked to the vehicle drive wheel or wheels, wherein the electric energy used to power the motors is stored in an onboard battery system. While an onboard auxiliary power unit, e.g., a gasoline or diesel engine, may supply additional electrical energy to the onboard battery system, the vehicle also provides a plug-in interface or other power conductive or inductive interface to allow the user to charge the onboard battery system from a municipal electrical power grid.

In theory, it would be desirable to have an onboard battery system of unlimited energy storage capacity. However in practice, the onboard battery system will typically have an energy storage capacity that is limited by weight, cost and/or size constraints. High-capacity cells in a battery of a suitable size may be prohibitively expensive, while normal capacity cells in a battery having a high overall capacity may be unsuitable in size and/or weight. For example, lead acid batteries are inexpensive, but are heavy and bulky for a given capacity, while lithium polymer and lithium ion batteries have good energy density but are constrained by cost.

Thus, other than for extended range vehicles, the practical electric vehicle will often have a range-per-charge that is less than the range-per-tank attainable with a counterpart fuel-powered vehicle. As such, it is generally important to maintain the charge state in the battery system of the electric vehicle so that the existing capacity is efficiently utilized. However, a user may not necessarily remember to plug in their vehicle after use at home or during a long stop over at a charging location. As a result, the already limited range of the vehicle may be further compromised. Thus, a system of providing battery charge state clarity and predictability is needed.

BRIEF SUMMARY OF THE INVENTION

The invention provides a system and apparatus for assisting users of electric vehicles in maintaining a proper charge state in their vehicle batteries. In particular in one aspect, the described method assists a user of an electric vehicle having a chargeable onboard energy storage system in maintaining a charge state of the chargeable onboard energy storage system. The method includes, in this aspect, a user interface outside of the vehicle that facilitates the streamlined creation of charge profiles, while also providing a link to utility providers. The user may manage multiple charge profiles via the external interface.

The remote interface is hosted on a mobile device in one implementation. Alternatively or additionally, the interface may be hosted via a web or voice portal. A wizard interface is provided in an optional implementation to allow the user to set charge profiles based on user preferences.

Location data captured during driver charge events is used in an optional implementation to determine the utility provider or to compile a small list of providers from which the user may select a provider. The user enters charge preferences and any required departure time via the user interface, allowing the wizard to send charge parameters to the vehicle to facilitate optimal charging. A charge preference may be, for example, "always" (allowing charging at any time) or "best-rate" (allowing charging only when the rate charged for electricity is at a temporally local minimum, i.e., late at night).

In an implementation, a user is presented with a profile view on the web, e.g., by logging into an appropriate service. Within this implementation, the user is able to save any profiles created or modified and to select a profile to apply at a current time as well as optionally at a later time. For example, the user may set up and apply a profile for vacation time as well as a profile for commuting. In an implementation, the user may also opt to apply a selected profile to another vehicle as well.

The system provides an intuitive user interface to allow manual entry or configuration for automatic entry. The system also enhances the ability to connect to data providers and the ability to manage multiple profiles off board. In an implementation, the system facilitates control of charge profiles by a utility.

The vehicle telematics facilities allow linkage with utility data via the associated wireless network and also allow exploitation of data collected by the onboard telematics facilities to provide charge history. Other objects and advantages of the invention will be appreciated by those of skill in the art upon reading this description in conjunction with the included figures of which:

DETAILED DESCRIPTION OF THE INVENTION

In general terms, not intended to limit the claims, the invention is directed to a system for ensuring a proper charge level in an electric vehicle. In this context, a system and apparatus are described for assisting vehicle users in maintaining a proper charge state in their vehicle batteries, allowing them to use the vehicle in the most energy efficient manner possible.

Figure 1:
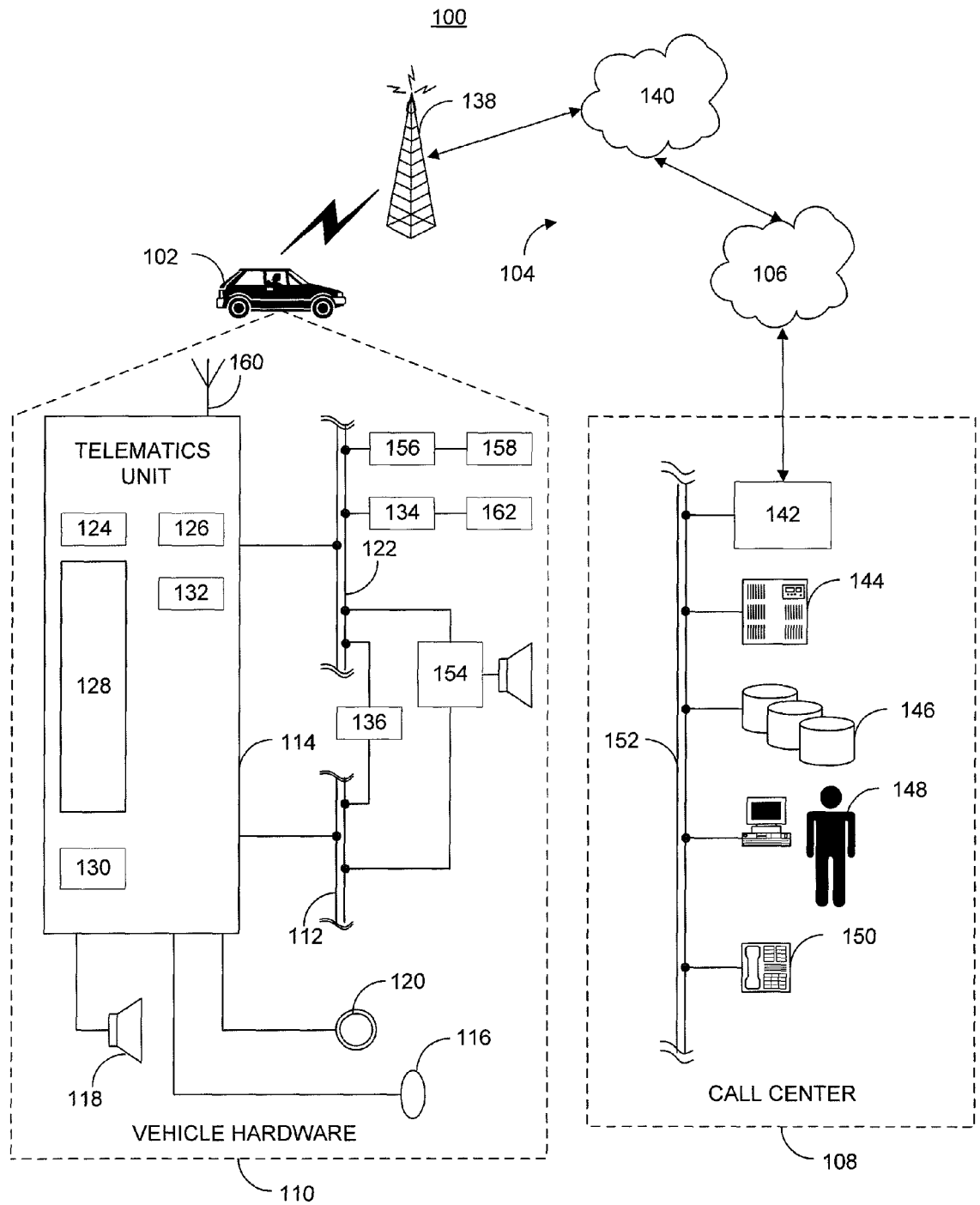
FIG. 1 is a schematic diagram of an operating environment for a mobile vehicle communication system within which the described principles may be implemented.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present system and method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method or form part of the present system as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) 180 of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

As discussed in summary above, the telematics unit 114 may be used in conjunction with other components described by reference to FIG. 1 to enable profile-based battery system charging, including rate data collection and transmittal. Before describing this aspect in greater detail, an exemplary electric vehicle is described with reference to FIG. 2 to provide the context within which aspects of the invention may be implemented.

Figure 2:
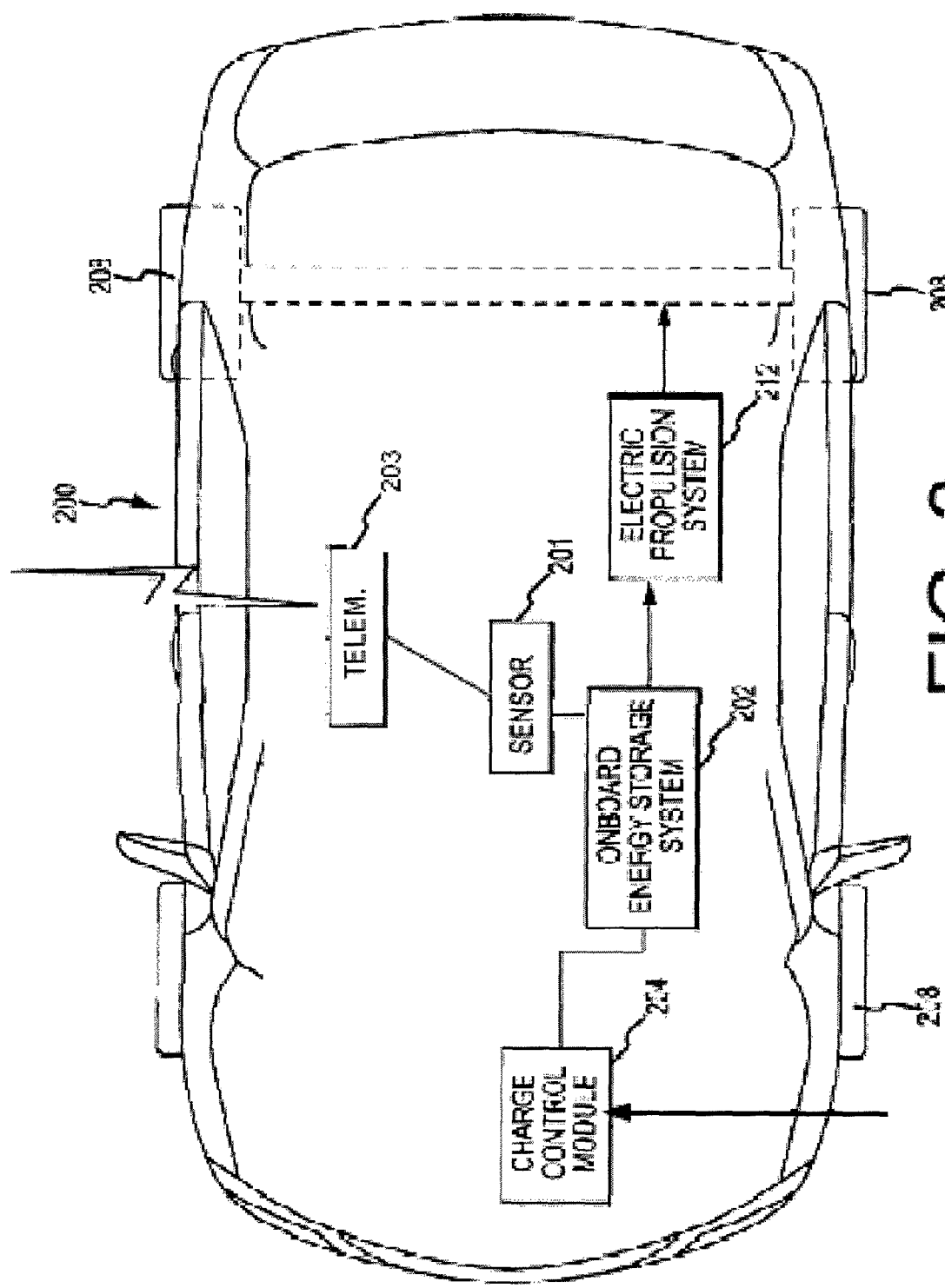
FIG. 2 is a schematic diagram of an electric vehicle within which the described principles may be implemented.

With reference to FIG. 2 there is shown an example of an electric vehicle architecture 200 that may be used with the present system and method. Although the illustrated architecture does not show an engine or APU, it will be appreciated that the electrical storage means, e.g., the battery, is at least externally chargeable via a plug or other external interface, and may additionally be internally chargeable via an APU, regenerative braking, etc. The illustrated plug-in vehicle 200 includes a number of basic systems to allow the controlled and efficient use of electrical power to propel the vehicle 200.

In particular, the illustrated system includes an onboard energy storage system 202, which may be a battery, or other chemical, electrochemical, or mechanical energy storage system. Onboard energy storage system 202 may be realized as a rechargeable battery pack having a single battery module or any number of individual battery modules or cells. A sensor 201 linked to the energy storage system 202 is used to analyze the state of charge/discharge of the energy storage system 202. The sensor 201 may be linked to a telematics unit 203, such as described in regard to element 114 of FIG. 1. A charge control module 204 coupled to the onboard energy storage system 202 allows for the controlled charging of the energy storage system 202, to avoid damage to the system and to ensure full charging.

The energy storage system 202 supplies electrical energy to a vehicle propulsion system, e.g., electric propulsion system 212. The electric propulsion system 212 may include one or more electric motors, e.g., brushed or brushless motors of an AC or DC configuration, to drive one or more wheels 208. Electronic devices, electronic control modules, and processing components of plug-in vehicle 200 may be coupled together using a data communication bus, conductive elements, and/or any suitably configured interconnection architecture. FIG. 2 depicts various electrical and mechanical connections and couplings in a very simplified manner for ease of description, and should not be understood to limit the number or type of interconnections or components. Moreover, it is not intended to show every connection or component needed for operation of the vehicle 200.

The charge control module 204 may include any type of processing element or vehicle controller, and it can be equipped with nonvolatile memory, random access memory (RAM), discrete and analog input/output (I/O), a central processing unit, and/or communications interfaces for networking within an automotive communications network. Moreover, the method steps described herein may be embodied directly in hardware, in firmware, in a software module executed by a processor, or in any practical combination thereof. A software module may reside in RAM memory, flash memory, ROM memory, EPROM memory, EEPROM memory, registers, a hard disk, a removable disk, a CD-ROM, or any other form of storage medium known in the art. In this regard, an exemplary storage medium can be coupled to a processor such that the processor can read information from, and write information to, the storage medium. Alternatively, the storage medium may be integral to the processor. As an example, the processor and the storage medium may reside in an ASIC.

As noted above, the described principles provide a system that allows the creation and application of charge profiles to facilitate the charging of electric vehicle batteries such as within vehicle 200. The external user interface described hereinafter by reference to FIG. 3 facilitates the creation and application of charge profiles. In particular, the interface 300 may be generated by and displayed on a personal computer, e.g., from a server via a wired or wireless connection, or may be hosted on a user's portable communication device, after being generated at the device or at a remote server. The interface 300 includes a header portion 301 for identifying the vehicle for which the profile is being created or applied, e.g., "John's Car" in the illustrated example.

The interface 300 may also include time/rate selection elements such as first time range indicator 303, second time range indicator 305, and associated respective rate information 307 and 309. In the illustrated example, the exemplary rate information 307 and 309 indicates that the rate for electricity from the utility during June through October was 3.65 c/KWh at night (7 PM to 11 AM) and 11.550 c/KWh in the daytime (11 AM to 7 PM). This information is gathered from the utility via a link from the communications device to the utility, e.g., over the Internet, or is gathered by the vehicle telematics unit 114 and wirelessly communicated, directly or indirectly, to the communications device.

In the illustrated example, the user has chosen to charge at any time, whether night or day. This is shown by the selection indicators 311 and 313. While this is the most expedient way to charge, it will generally not be the most economical way to do so. Once the user has selected permissible charge periods for the profile, he or she selects a finish or "OK" element.

Figure 3:
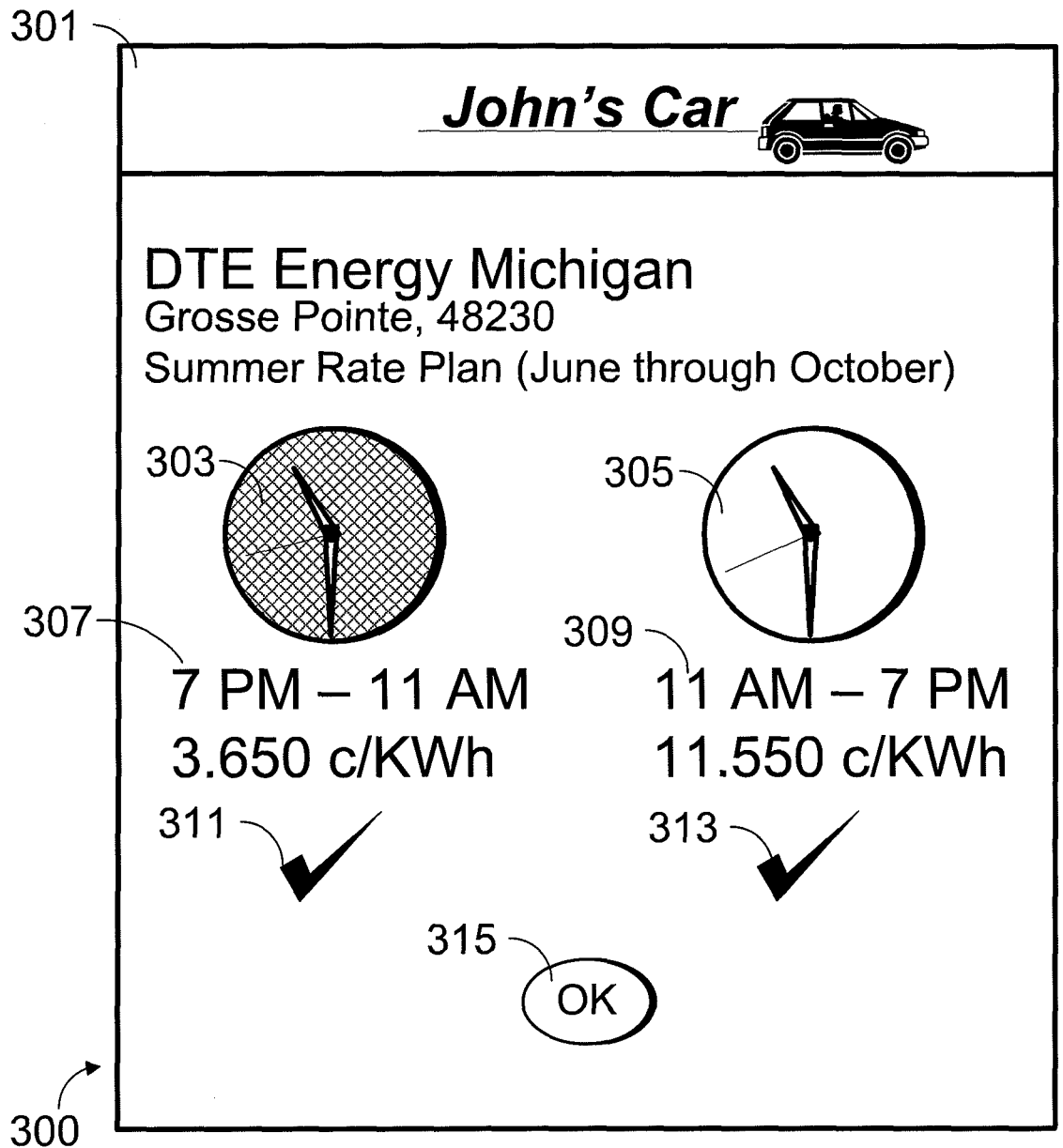
FIG. 3 is a schematic diagram of an external user interface to facilitate the creation and application of charge profiles in keeping with the described principles.
Figure 4:
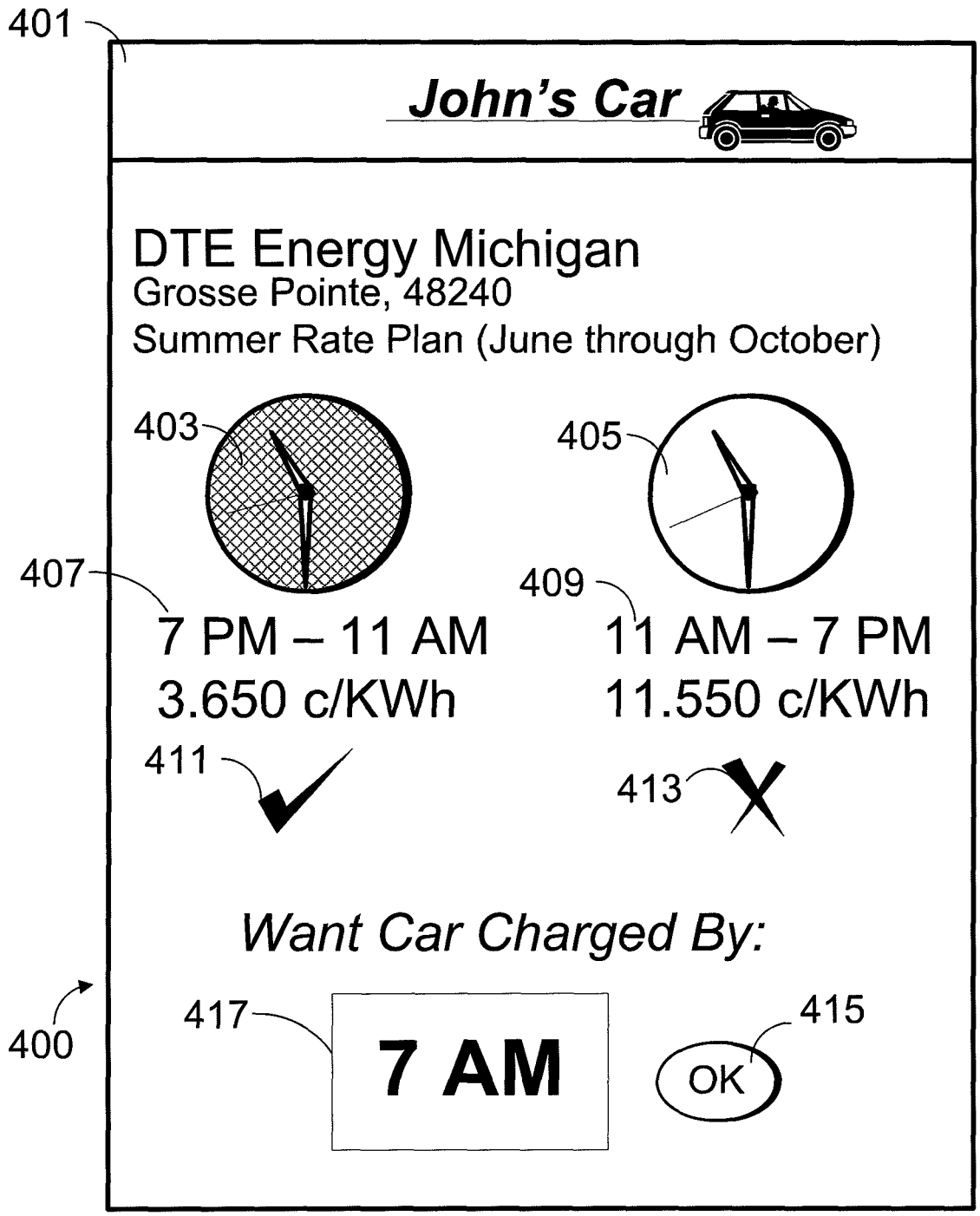
FIG. 4 is a schematic diagram of an additional external user interface to facilitate the creation and application of charge profiles in keeping with the described principles.

FIG. 4 illustrates a similar interface 400 to that shown in FIG. 3, wherein the user has elected that charging should not occur during the high rate day time period. This selection is made by the user in the illustrated example by deactivating the selection indicator 313 (413) while leaving the selection indicator 311 (411) active. Thus, the system cannot charge at all times and must determine when charging is to begin. In order to do so, the system presents the user with a time field 417 for selecting the time by which charging should be completed. In the illustrated example, the user has chosen that the vehicle should be fully charged by 7 AM, which may be for example, the user's planned departure time for a morning commute. The remaining aspects of the interface of FIG. 4 are associated with reference numbers used in FIG. 3 for like elements.

Figure 5:
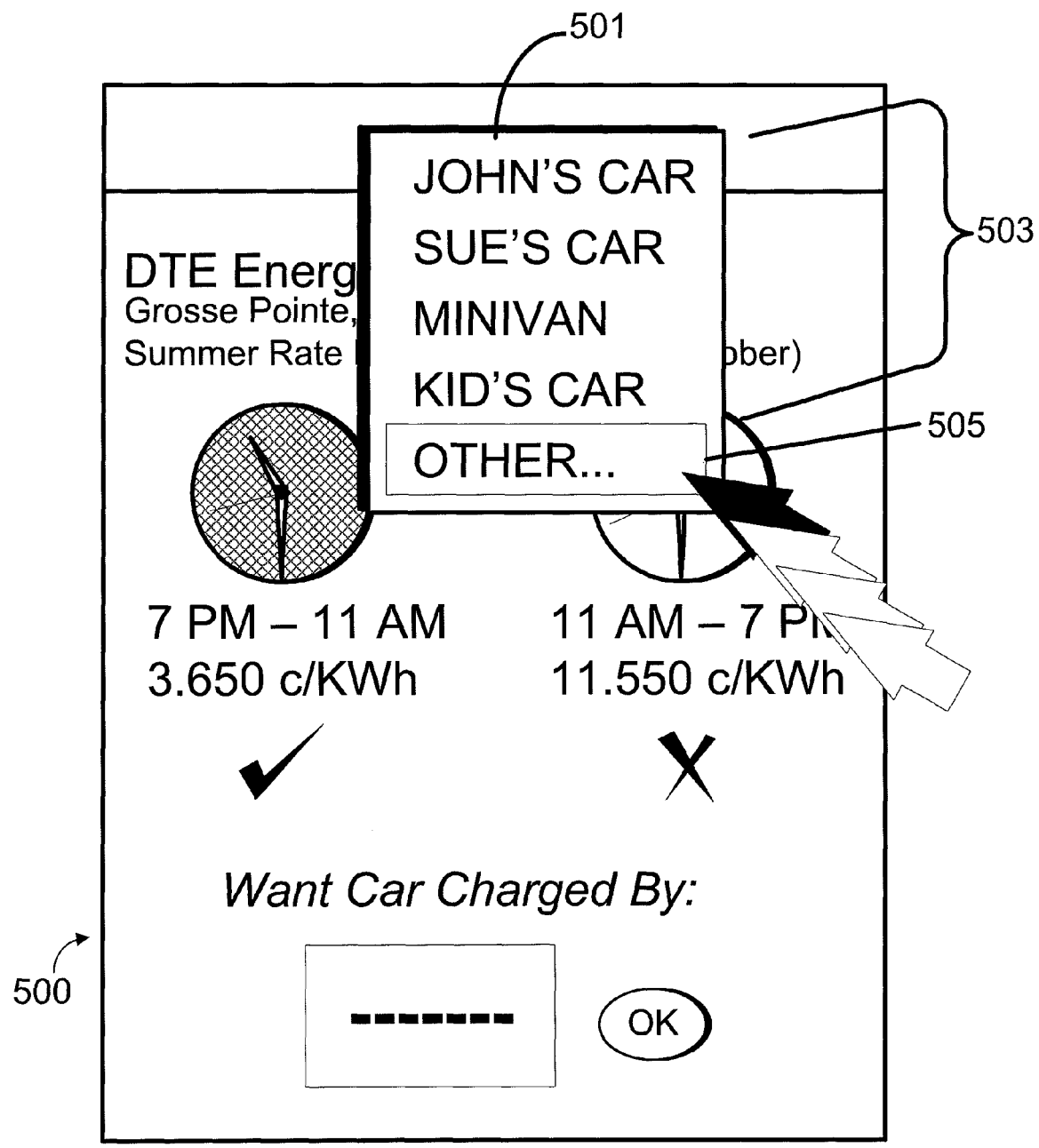
FIG. 5 is a schematic diagram of an external user interface showing vehicle selection for a charge profile in keeping with the described principles.

As noted above, the user may opt to manage multiple charge profiles via the external interface 300, 400. In this case, the user may select a vehicle from a pull down menu 501 listing 503 as shown in FIG. 5, or may select "other" 505 to prompt entry of a new vehicle and its associated data to facilitate communication with the vehicle.

It will be appreciated that the remote interface may be hosted on a mobile device or may be hosted via a web site or voice portal. As will be discussed more fully in reference to the process 600 of FIG. 6, location data captured during driver charge events may be used in an optional implementation to determine the utility provider or to compile a listing of providers from which the user may select a provider. After entry of a charge profile, the system sends the charge parameters to the vehicle to facilitate optimal charging based on a determined time. The parameters may be sent immediately so that the vehicle telematics unit or other onboard device can track the charge state and time, or the charge parameters may be tracked by the remote entity and used to generate a charge command at the appropriate time.

Figure 6:
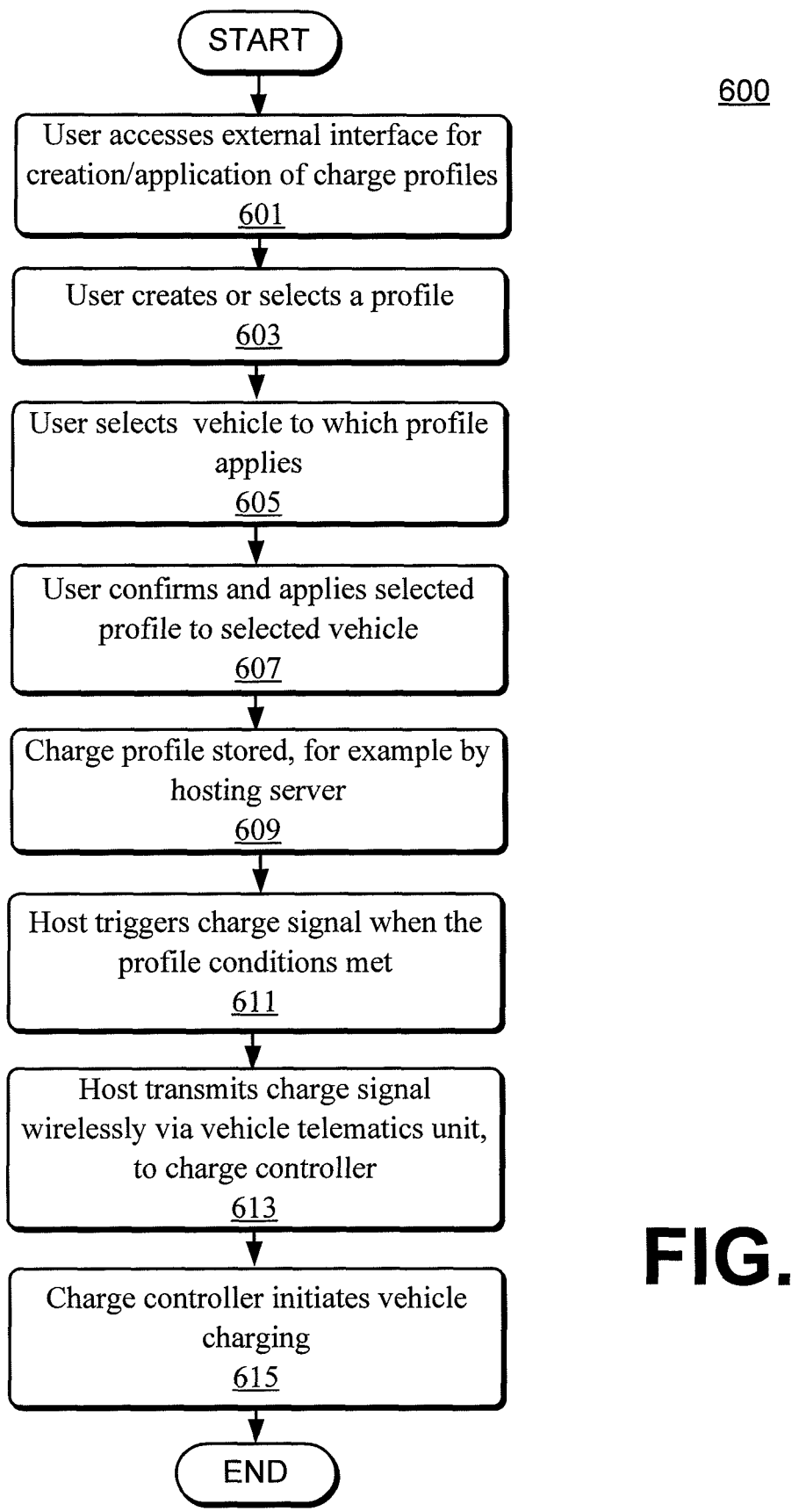
FIG. 6 is a flow chart of a process for profile creation and management according to the described principles.

The flowchart of FIG. 6 illustrates a process 600 for the creation and application of charge profiles in keeping with the described principles. At stage 601 of the process 600, the user accesses an external interface for the creation and/or application of charge profiles as shown for example, in FIGS. 3-5. Having accessed the interface, the user creates or selects a profile at stage 603. It will be appreciated that the rate information portion of the profile may be based on a single available utility or may be based on a user-selected one of multiple available utilities. In either case, the available utility or utilities and associated data are collected by the telematics unit 114 and sent to the remote device.

The selected profile may be associated with a specific vehicle or may not yet be so associated. At stage 605, assuming that the profile is either not yet associated with a vehicle or is not associated with the vehicle to which the user intends to apply the profile, the user selects a vehicle to which the profile applies. This may be accomplished via a manual entry or via selection of a drop down option as shown in FIG. 5. Finally, the user elects to confirm and apply the selected profile to the selected vehicle in stage 607, e.g., by actuating an "OK" or "Finish" button on the user interface.

At this point, the charge profile is stored at stage 609, e.g., on the hosting server or another server linked to the hosting server. However, it will be appreciated that the profile may instead be transmitted to the vehicle through the vehicle telematics unit for local management and application in an alternative implementation.

The managing entity, typically the server storing the profile, triggers a charge signal when the profile conditions are met at stage 611. The charge signal is wirelessly transmitted to the vehicle via the vehicle telematics unit, and from there to the charge controller, for example, at stage 613. The charge controller then actuates vehicle charging at stage 615. In an implementation, the managing entity continues to monitor the correspondence of current conditions with the associated profile conditions, and when the profile conditions are no longer met, the managing entity may transmit a stop charge signal.

In an implementation, the user is able to create, modify, save and select profiles via the hosted user interface and may select a profile to apply at a current time as well as optionally at a later time. For example, the user may set up and apply a profile for vacation time as well as a profile for commuting. Thus, a profile may have a date limitation or day of week limitation in addition to a time limitation. In an implementation, the user may also opt to apply a selected profile to another vehicle as well.

The vehicle telematics facilities allow linkage with utility data via the associated wireless network and also allow exploitation of data collected by the onboard telematics facilities to provide charge history. It will be appreciated that in a preferred implementation, the profile creation and management process is executed remotely from the vehicle, with data and commands being exchanged via the telematics unit of the vehicle and/or associated components. The remote host may be the call center 108 or a server associated with the call center 108 in an implementation or may be independent of the call center.

It will be appreciated by those of skill in the art that the execution of process 600 occurs via the computerized execution of computer-executable instructions stored on a computer-readable medium, e.g., RAM, ROM, PROM, volatile, nonvolatile, or other electronic memory mechanism.

Thus it will be appreciated that the disclosed system and method provide an intuitive user interface to allow manual entry of charge profiles or configuration for automatic entry. The system and method also facilitate the collection of rate data from utility data providers and provide the ability to manage multiple profiles off board of the vehicle. It will be appreciated, however, that the described systems, methods and implementations are merely examples of the inventive principles, and that these illustrate only preferred techniques. It is contemplated that other implementations of the invention may differ in detail from the foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for management of the recharging of an electric vehicle by a server, the method comprising:
   providing, by the server, charging rate information indicating a plurality of charging rates for recharging and time ranges respectively associated with the plurality of charging rates, via a wireless network, to a user computing device;
   receiving, by the server, a user designation of a recharging profile for the electric vehicle, the recharging profile indicating an allowable time range for recharging the electric vehicle based on the charging rate information;
   determining, by the server, based on the allowable time range for recharging the electric vehicle indicated by the recharging profile, a time at which the vehicle is to begin recharging; and
   providing, by the server, via the wireless network, instructions to a telematics unit of the electric vehicle so as to cause the telematics unit to actuate recharging of the electric vehicle at the determined time at which the electric vehicle is to begin recharging.

2. The method according to claim 1, wherein the telematics unit of the electric vehicle is configured to communicate with a recharging controller of the electric vehicle to actuate the recharging of the electric vehicle.

3. The method according to claim 1, wherein the recharging profile includes a user designation of a time by which recharging of the vehicle must be completed; and
   wherein the determined time at which the vehicle is to begin recharging is based on the time by which recharging must be completed.

4. The method according to claim 1, wherein the charging rate information provided by the server to the user computing device corresponds to a first utility provider, and wherein the method further comprises:
   providing, by the server, charging rate information indicating a plurality of charging rates for recharging and time ranges respectively associated with the plurality of charging rates corresponding to a second utility provider; and
   wherein the recharging profile includes a user designation of a utility provider for providing electrical power for recharging.

5. The method according to claim 1, wherein the server receives user designations of recharging profiles with respect to a plurality of electric vehicles and provides instructions to telematics units of the plurality of electric vehicles to actuate recharging for each respective electric vehicle.

6. A non-transitory computer-readable medium having processor-executable instructions stored thereon for management of recharging of an electric vehicle by a server, the processor-executable instructions, when executed by a processor, facilitating performance of the following steps:
   providing charging rate information indicating a plurality of charging rates for recharging and time ranges respectively associated with the plurality of charging rates, via a wireless network, to a user computing device;
   receiving a user designation of a recharging profile for the electric vehicle, the recharging profile indicating an allowable time range for recharging the electric vehicle based on the charging rate information;
   determining, based on the allowable time range for recharging the electric vehicle indicated by the recharging profile, a time at which the vehicle is to begin recharging; and
   providing, via the wireless network, instructions to a telematics unit of the electric vehicle so as to cause the telematics unit to actuate recharging of the electric vehicle at the determined time at which the electric vehicle is to begin recharging.

7. The non-transitory computer-readable medium according to claim 6, wherein the telematics unit of the electric vehicle is configured to communicate with a recharging controller of the electric vehicle to actuate the recharging of the electric vehicle.

8. The non-transitory computer-readable medium according to claim 6, wherein the recharging profile includes a user designation of a time by which recharging of the vehicle must be completed; and
   wherein the determined time at which the vehicle is to begin recharging is based on the time by which recharging must be completed.

9. The non-transitory computer-readable medium according to claim 6, wherein the charging rate information provided by the server to the user computing device corresponds to a first utility provider, and wherein the processor-executable instructions further include instructions, when executed by the processor, facilitating the performance of the following:
   providing charging rate information indicating a plurality of charging rates for recharging and time ranges respectively associated with the plurality of charging rates corresponding to a second utility provider; and
   wherein the recharging profile includes a user designation of a utility provider for providing electrical power for recharging.

10. The non-transitory computer-readable medium according to claim 6, wherein the server receives user designations of recharging profiles with respect to a plurality of electric vehicles and provides instructions to telematics units of the plurality of electric vehicles to actuate recharging for each respective electric vehicle.

11. A system for management of recharging of an electric vehicle by a server, the system comprising:
   a server, configured to:
      provide charging rate information indicating a plurality of charging rates for recharging and time ranges respectively associated with the plurality of charging rates, via a wireless network, to a user computing device;
      receive a user designation of a recharging profile for the electric vehicle, the recharging profile indicating an allowable time range for recharging the electric vehicle based on the charging rate information;
      determine, based on the allowable time range for recharging the electric vehicle indicated by the recharging profile, a time at which the vehicle is to begin recharging; and
      provide, via the wireless network, instructions to a telematics unit of the electric vehicle so as to cause the telematics unit to actuate recharging of the electric vehicle at the determined time at which the electric vehicle is to begin recharging; and the telematics unit of the electric vehicle, configured to communicate with the server to receive the instructions and to communicate with a recharging controller of the electric vehicle to actuate the recharging of the electric vehicle.

12. The system according to claim 11, wherein the recharging profile includes a user designation of a time by which recharging of the vehicle must be completed; and wherein the determined time at which the vehicle is to begin recharging is based on the time by which recharging must be completed.

13. The system according to claim 11, wherein the charging rate information provided by the server to the user computing device corresponds to a first utility provider;

wherein the server is further configured to: provide charging rate information indicating a plurality of charging rates for recharging and time ranges respectively associated with the plurality of charging rates corresponding to a second utility provider; and wherein the recharging profile includes a user designation of a utility provider for providing electrical power for recharging.

14. The system according to claim 11, wherein the server is further configured to receive user designations of recharging profiles with respect to a plurality of electric vehicles and to provide instructions to telematics units of the plurality of electric vehicles to actuate recharging for each respective electric vehicle.

* * * * *